(12) United States Patent
Md Saad et al.

(10) Patent No.: US 10,240,936 B1
(45) Date of Patent: Mar. 26, 2019

(54) DEVICE AND METHOD FOR ELECTRONICALLY DEPLOYING RESPONDERS

(71) Applicant: MOTOROLA SOLUTIONS, INC., Chicago, IL (US)

(72) Inventors: Md Reduan Md Saad, Bukit Mertajam (MY); Shu Khan Lee, Kuala Lumpur (MY); Soon Heng Lim, Tanjung Bunga (PG); Wizatul Izyan binti Wahid, Bayan Lepas (MY); Chew How Lim, Sungai Petani (MY); Muhammad Asiff bin Muhammad Sazri, Tasek Gelugor (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 26 days.

(21) Appl. No.: 15/716,956

(22) Filed: Sep. 27, 2017

(51) Int. Cl.
*H04W 4/90* (2018.01)
*G06Q 10/06* (2012.01)
*G01C 21/34* (2006.01)

(52) U.S. Cl.
CPC ......... *G01C 21/3407* (2013.01); *G06Q 10/06* (2013.01); *H04W 4/90* (2018.02)

(58) Field of Classification Search
CPC ...... G01C 21/3407; H04W 4/90; H04W 4/22; G06Q 10/06
USPC .................................... 455/521, 404.1–404.2
See application file for complete search history.

(56) References Cited

U.S. PATENT DOCUMENTS

| | | | | |
|---|---|---|---|---|
| 7,134,088 B2 * | 11/2006 | Larsen | ................. | G09B 9/003 |
| | | | | 715/765 |
| 7,395,151 B2 | 7/2008 | O'Neill et al. | | |
| 7,634,156 B2 * | 12/2009 | Ciccarelli | ............. | G08B 25/14 |
| | | | | 345/660 |
| 8,896,696 B2 * | 11/2014 | Ellsworth | .......... | G06F 17/3087 |
| | | | | 348/144 |
| 9,389,083 B1 * | 7/2016 | Agulnik | ................. | G01C 21/00 |
| 9,852,342 B2 * | 12/2017 | Kanga | ................ | G06K 9/00711 |
| 9,903,726 B2 * | 2/2018 | Baughman | ......... | G01C 21/3415 |
| 2002/0143464 A1 * | 10/2002 | Blewitt | ............. | G01C 21/3461 |
| | | | | 701/411 |
| 2005/0003797 A1 * | 1/2005 | Baldwin | ................. | H04W 4/90 |
| | | | | 455/404.1 |
| 2006/0158330 A1 * | 7/2006 | Gueziec | ................ | H04W 4/029 |
| | | | | 340/539.13 |
| 2010/0153002 A1 * | 6/2010 | Lee | .................... | G01C 21/3407 |
| | | | | 701/533 |
| 2014/0372015 A1 * | 12/2014 | Namm | ................. | H04W 4/046 |
| | | | | 701/117 |
| 2016/0358080 A1 * | 12/2016 | Blanco | ................... | G01S 19/00 |

* cited by examiner

*Primary Examiner* — Edward F Urban
*Assistant Examiner* — Ralph H Justus
(74) *Attorney, Agent, or Firm* — Perry + Currier, Inc.

(57) ABSTRACT

A device and method for electronically deploying responders is provided. The device includes a communication interface and a controller having access to a map database. The controller is configured to: receive, via the communication interface, a location of an incident; identify respective locations of at least two communication devices associated with respective responders; select, using the map database, different respective routes from the respective locations to the location for each of the at least two communication devices, the different respective routes selected to reduce duplication therebetween; and provide the different respective routes to each of the at least two communication devices.

20 Claims, 14 Drawing Sheets

DEVICE AND METHOD FOR ELECTRONICALLY DEPLOYING RESPONDERS

BACKGROUND OF THE INVENTION

When a command center receives an incident report that includes a location of a crime scene, the command center may direct police officers, and the like, to the location using various paths, and often the shortest and/or fastest path. Along the path, the first responder may collect circumstantial evidence using mobile devices, dashcams, and the like. Collecting as much evidence as possible enroute to the location can be an important part of the deployment of the police officers.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
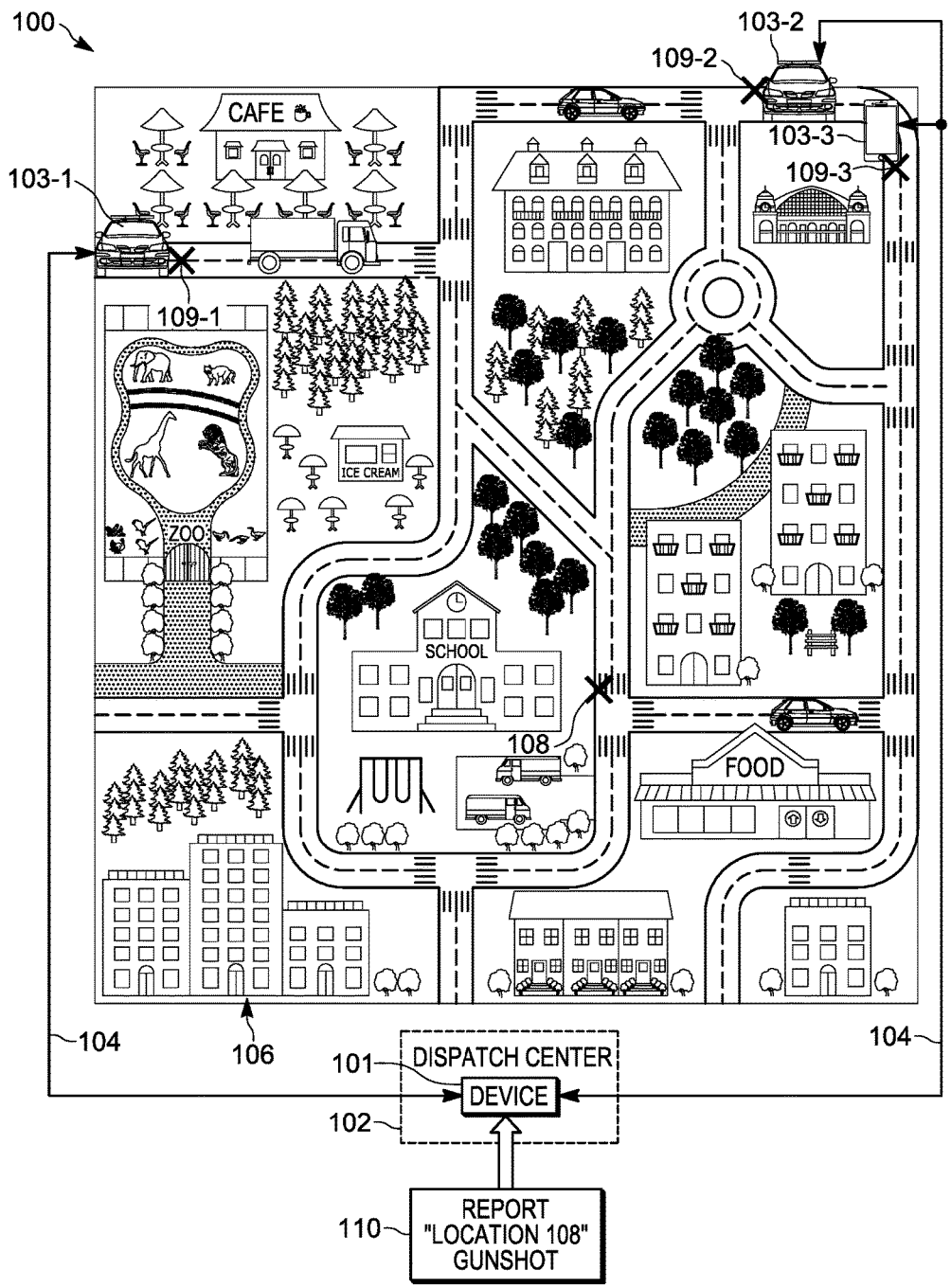
FIG. 1 depicts a system that includes a dispatch device for electronically dispatching responders in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When a command and/or dispatch center receives an incident report that includes a location of an incident such as a crime, the command center may direct responders, such as police officers, in vehicles, on bicycles, on motorcycles and/or on foot, and the like, to the location using only the shortest and/or fastest path. However, a criminal fleeing the location may take another path, and/or when there is more than one criminal, they may take different paths. As the police officers proceed to the location, associated devices (such as video recording devices, dashcams and the like) collect evidence and/or circumstantial evidence (e.g. images and/or video and/or audio) along the path to the location, in the event that a criminal discards evidence of the crime (e.g. guns, money, stolen items) as they flee from the location. Hence, when all the responders are directed along a shortest and/or fastest path, the chances of missing a criminal and/or evidence is likely. Hence, provided herein is a device and method for electronically deploying responders, such as police officers, along different paths such that a likelihood of capturing a criminal and/or circumstantial evidence is increased relative to deploying all the responders along a shortest and/or fastest path.

An aspect of the specification provides a device comprising: a communication interface; and a controller having access to a map database, the controller configured to: receive, via the communication interface, a location of an incident; identify respective locations of at least two communication devices associated with respective responders; select, using the map database, different respective routes from the respective locations to the location for each of the at least two communication devices, the different respective routes selected to reduce duplication therebetween; and provide the different respective routes to each of the at least two communication devices.

Another aspect of the specification provides a method comprising: receiving, at a controller, via a communication interface, a location of an incident; identifying, at the controller, respective locations of at least two communication devices associated with respective responders; selecting, at the controller, using a map database accessible to the controller, different respective routes from the respective locations to the location for each of the at least two communication devices, the different respective routes selected to reduce duplication therebetween; and providing, using the controller, the different respective routes to each of the at least two communication devices.

FIG. 1 is a block diagram of a system 100 that includes a dispatch device 101, such as a computer aided dispatch device located at a dispatch center 102, in communication with at least two data communication devices 103-1, 103-2, 103-3 associated with respective responders, using one or more communication links 104. The at least two data communication devices 103-1, 103-2, 103-3 will be interchangeably referred to hereafter, collectively, as communication devices 103, and generically as a communication device 103.

As further depicted in FIG. 1, the communication devices 103 are located in a geographic region 106 where an incident, such as a crime, has occurred at a location 108. The geographic region 106 is depicted schematically and includes geographic features such as roads, buildings, parks, a train station etc.

As described in more detail below, each of the communication devices 103 are configured to communicate with the device 101 via the links 104 and are furthermore configured to receive dispatch commands that include a route to a location of an incident.

In particular, as depicted, the communication devices 103-1, 103-2, 103-3 are located at respective locations 109-1, 109-2, 109-3 in the geographic region 106. The locations 109-1, 109-2, 109-3 will be interchangeably referred to hereafter, collectively, as locations 109 and/or starting locations 109, and generically as a location 109 and/or a starting location 109.

Each of the communication device 103 may be configured to determine their respective locations 109, for example via a location determining device and report their respective location 109 to the device 101 via the links 104, for example periodically and/or upon request from the device 101. Alternatively, and/or in addition to, the device 101 is configured to identify the locations 109 of each of the communication devices 103 using triangulation techniques and the like, for example by querying cell phone towers, and the like. Either way, the device 101 is generally configured to identify the respective locations 109 of the at least two communication devices 103.

As depicted, the device 101 is receiving a report 110 of the location 108 (e.g. "Location 108") of an incident and of a type of the incident (e.g. "Gunshot"), for example from a 911 call center (not depicted) and the like. The "Location 108" of the incident received in the report 110 may include a street address, Global Positioning System (GPS) coordinates, Globalnaya Navigazionnaya Sputnikovaya Sistema (GLONASS) coordinates, and the like. The incident type "Gunshot" may be in form of text, an incident code, and the like. As will be described in detail below, the device 101 is generally configured to determine a respective route for each of the communication devices 103 from a respective starting location 109 to the location 108, and transmit, to the communication devices 103, the respective routes to the location 108 for example in form of respective dispatch commands.

As depicted the communication devices 103 include various physical platforms, including, but not limited to, a vehicle (e.g. the communication devices 103-1, 103-2) and a mobile communication device (e.g. the communication device 103-3). For example, the communication devices 103-1, 103-2 may each comprise a radio, and the like, at a police vehicle, of a respective responder (e.g. a driver and/or a passenger of the police vehicle), that includes a dashcam and/or a video recording device, and the communication device 103-3 may include a handheld communication device carried by a responder, such as a police officer, on foot or on a bicycle or on a motorcycle, a horse, and the like. However, any type of physical platform for the communication devices 103 is within the scope of the present specification.

Each of the communication device 103 is hence associated with one or more respective responders, such as police officers, and the responders are dispatched to the location 108 by way of the device 101 transmitting a respective route to the location 108 to the communication devices 103.

While three communication devices 103 are depicted, a number of the devices 103 may include more than three communication devices 103, or as few as two communication devices 103, depending, for example, on a number of responders and/or police officers and/or emergency responders being dispatched within the system 100 and/or by the device 101 to the location 108.

Furthermore, the system 100 may include other communication devices that are outside the depicted geographic region 106, however, the depicted geographic region 106 may represent a perimeter around the location 108, as determined by the device 101 when the report 110 is received, and the device 101 may be configured to generate dispatch commands and determine respective routes to the location 108 only for the communication devices 103 that are inside a perimeter around the location 108, the perimeter determined by the device 101 based, for example, on a type of incident at the location 108.

Furthermore, while example embodiments are described herein with respect to the responders being police officers being dispatched to respond to a crime at the location 108, other types of responders may be dispatched (e.g. via the communication devices 103) to the location 108 including, but not limited to, first responders, firefighters, paramedics, and the like.

Furthermore, other types of incidents may occur at the location 108 to which responders may be dispatched, including, but not limited to, fires, medical emergencies, and the like.

Indeed, in yet further embodiments, the responders dispatched to the location (e.g. via the communication devices 103) may not be first responders, but employees and/or users associated with a commercial entity and the like (e.g. power company employees, telephone company employees), and the incident at the location 108 may not be a first responder incident, but an incident associated with the commercial entity, such as a power outage, a communication outage and the like.

In some embodiments, a portion of the communication devices 103, regardless of their physical configuration, may generally comprise a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, mobile camera devices and the like. Furthermore, one or more of the communication devices 103 (for example the communication devices 103-1, 103-2), may include vehicles, and the like (for example police cars, emergency service vehicles and the like), which in turn include a mobile device, such as a radio, an emergency radio, and the like.

Indeed, in some embodiments, one or more of the communication devices 103 are specifically adapted for emergency service radio functionality, and the like, used by emergency responders and/or emergency responders, including, but not limited to, police service responders, fire service responders, emergency medical service responders, and the like. In some of these embodiments, the communication devices 103 further includes other types of hardware for emergency service radio functionality, including, but not limited to, push-to-talk ("PTT") functionality.

In specific embodiments, the device 101 comprises a server and/or components of a computer aided dispatch (CAD) center (e.g. the dispatch center 102) and/or a command center, including, but not limited to, an emergency dispatch center used to communicate with first responders and/or emergency responders, and hence the device 101 may comprise a server device and/or a communication device configured to dispatch the communication devices 103 to the location 108.

However, the device 101 may alternatively comprise one of the communication devices 103, and/or any device configured to generate dispatch commands that include respective routes to a location. In implementations where a communication device 103 comprises a vehicle, such a communication device 103 may be a component of a vehicle area network (VAN).

Figure 2:
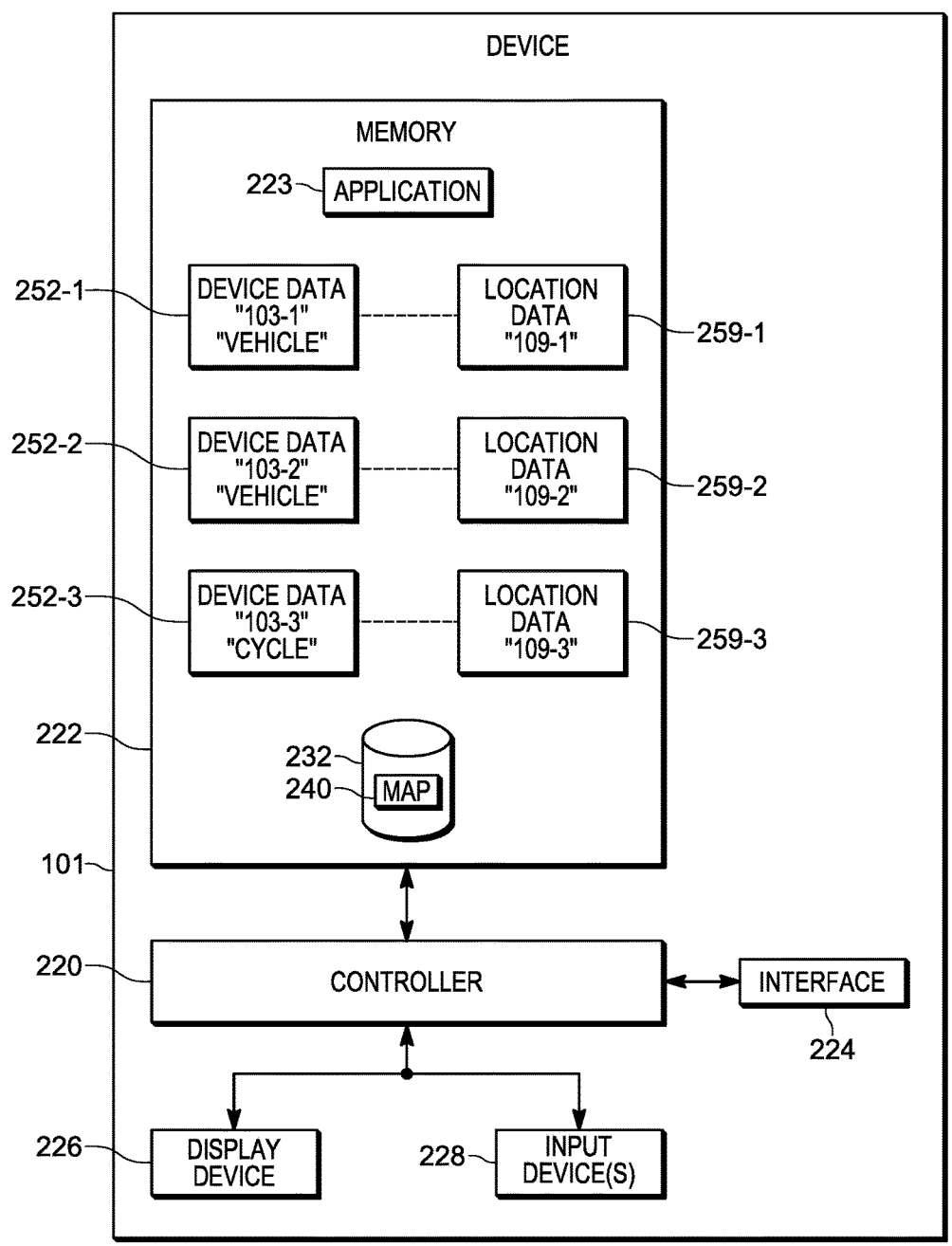
FIG. 2 depicts a block diagram of a dispatch device for electronically dispatching responders in accordance with some embodiments.

Attention is next directed to FIG. 2 which depicts a block diagram of the device 101. The device 101 comprises: a controller 220, a memory 222, storing an application 223, and a communication interface 224, interchangeably referred to hereafter as the interface 224, and optionally a display device 226 and at least one input device 228. The controller 220 is generally configured for communication with the communication devices 103, using the communication interface 224.

The controller 220 includes one or more logic circuits, one or more processors, one or more microprocessors, one or more ASIC (application-specific integrated circuits) and one or more FPGA (field-programmable gate arrays). In some embodiments, the controller 220 and/or the device 101 is not a generic controller and/or a generic device, but a device specifically configured to implement responder dispatch functionality. For example, in some embodiments, the device 101 and/or the controller 220 specifically comprises a computer executable engine configured to implement specific responder dispatch functionality.

The memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")).

As depicted in FIG. 2, the memory 222 further stores a database 232 that includes a map 240 of the geographic region 106, however the database 232 may store other maps of regions larger than the geographic region 106; indeed, the map 240 may be a portion of map of a region larger than the geographic region 106. Furthermore, the database 232 and/or the map 240 may be stored at another memory and/or device accessible to the controller 220. Either way, the controller 220 generally has access to a map database that includes a map of the geographic region 106.

As depicted, the memory 222 further stores device data 252-1, 252-2, 252-3 for each of the communication devices 103 (interchangeably referred to, hereafter, collectively and/or generically as the device data 252) which may include, but is not limited to a respective identifier (e.g. "103-1", "103-2", "103-3") of each of the communication devices 103, and an indication of a type and/or mode of transportation (e.g. "Vehicle", "Cycle" (which may include a bicycle and/or a motorcycle) of each of the communication devices 103). The device data 252 may be stored in respective association with location data 259-1, 259-2, 259-3 (interchangeably referred to, hereafter, collectively and/or generically as the location data 259) that includes an indication (e.g. "109-1", "109-2", "109-3") of the respective locations 109-1, 109-2, 109-3 of each of the communication devices 103, for example as received from each of the communication devices 103. The indications of the respective locations 109 may include, but is not limited to, a street address, GPS coordinates, GLONASS coordinates, and the like.

In the embodiment of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

In particular, the memory 222 of FIG. 1 stores instructions corresponding to the application 223 that, when executed by the controller 220, enables the controller 220 to implement responder dispatch functionality associated with the application 223. In the examples described herein, when the controller 220 executes the application 223, the controller 220 is enabled to: receive, via the communication interface 224, a location of an incident (e.g. as received in the report 110); identify respective locations 109 of at least two communication devices 103 associated with respective responders; select, using the map database 232, different respective routes from the respective locations 109 to the location 108 for each of the at least two communication devices 103, the different respective routes selected to reduce duplication therebetween; and provide the different respective routes to each of the at least two communication devices 103.

The interface 224 is generally configured to communicate with the communication devices 103 using wireless links 104, including, but not limited to, WiFi links, radio links, cellphone links, and the like. In other words, the links 104 may include any suitable combination of wireless networks, though a portion of such wireless networks may include wired networks. Such wireless networks may include a vehicle area network, and the like.

In some embodiments, the interface 224 is further configured to communicate with the one or more communication devices 103, for example, using one or more communication channels over the links 104. In these embodiments, the interface is implemented by, for example, one or more radios and/or connectors and/or network adaptors, configured to communicate wirelessly, with network architecture that is used to implement one or more communication channels between the device 101 and the communication devices 103 and/or a wireless network. In these embodiments, the interface 224 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, the interface 224 includes one or more local area network or personal area network transceivers operating in accordance with an IEEE 902.11 standard (e.g., 902.11a, 902.11b, 902.11g), or a Bluetooth™ transceiver which may be used to communicate with the communication devices 103 (e.g. assuming that one or more of the communication devices 103 are within range of such a local area network or personal area network transceiver). In some embodiments, the interface 224 is further configured to communicate "radio-to-radio" on some communication channels (e.g. in embodiments where the interface 224 includes a radio), while other communication channels are configured to use wireless network infrastructure.

Example communication channels over which the interface 224 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

Indeed, the term "channel" and/or "communication channel", as used herein, includes, but is not limited to, a physical radio-frequency (RF) communication channel, a logical radio-frequency communication channel, a trunking talk-group (interchangeably referred to herein a "talkgroup"), a trunking announcement group, a VOIP communication path, a push-to-talk channel, and the like.

However, in other embodiments, the interface 224 communicates with the one or more communication devices 103 using other servers and/or communication devices, for example by communicating with the other servers and/or communication devices using, for example, packet-based and/or internet protocol communications, and the like, and the other servers and/or communication devices use radio communications to wirelessly communicate with the one or more communication devices 103.

The optional display device 226 comprises any suitable one of, or combination of, flat panel displays (e.g. LCD (liquid crystal display), plasma displays, OLED (organic light emitting diode) displays) and the like, as well as one or more optional touch screens (including capacitive touch-screens and/or resistive touchscreens). The optional input device 228 comprises any suitable one of, or combination of keyboards, pointing devices, touchpads, touchscreens, buttons, and the like. Furthermore, when present, one or more of the display device 226 and the input device 228 may be external to the device 101 and accessible to the device 101 via the interface 224; for example, the display device 226 and/or the input device 228 may be components of one or more operator terminals (not depicted) used by one or more operators (not depicted) in a computer aided dispatch center such as the dispatch center 102.

In any event, it should be understood that a wide variety of configurations for the device 101 are within the scope of present embodiments.

Figure 3:
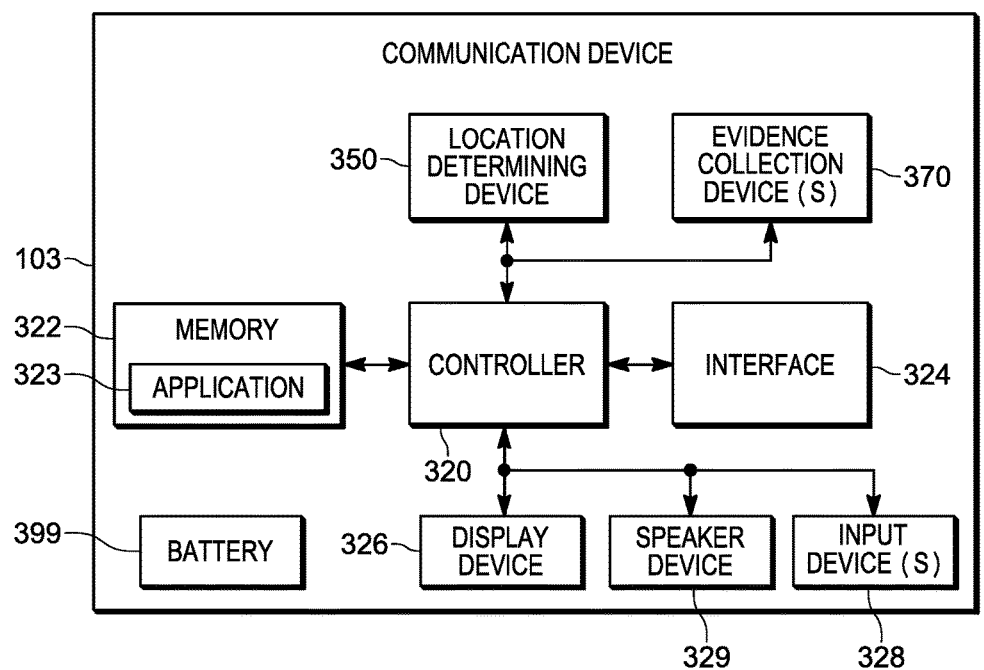
FIG. 3 depicts a block diagram of a communication device through which a responder is electronically dispatched in accordance with some embodiments.

Attention is next directed to FIG. 3 which depicts a block diagram of an example communication device 103. As depicted each communication device 103 comprises a controller 320, a memory 322 and a communication interface 324 (interchangeably referred to as the interface 324), as well as an optional display device 326 and at least one input device 328 and a speaker device 329. The controller 320, the memory 322 the interface 324, the display device 326 and the input device 328 are each respectively similar to the controller 220, the memory 222 the interface 224, the display device 226 and the input device 228 of the device 101, adapted, however, for the respective platform of the respective communication device 103.

As depicted, the communication device 103 further includes a location determining device 350, including, but not limited to, one or more of GPS device, a GLONASS device, a triangulation device, and the like. As depicted, the communication device 103 further includes a battery 399, and the like, configured to power the components of the communication device 103.

As depicted, the communication device 103 further includes one or more evidence collection devices 370 that may be used to acquire information that may be transmitted to the device 101, and/or another device, as circumstantial evidence, and the like. The one or more evidence collection devices 370 may include, but is not limited to, one or more of a camera device, a video recording device, an audio recording device, a dashcam (e.g. a dash-mounted camera and/or video camera on a vehicle), and the like. In some embodiments, the one or more evidence collection devices 370 may be external to the communication device 103 and accessible to the communication device 103 via the interface 324.

The speaker device 329 generally comprises any combination of speakers (including, but not limited to headphones) that may be controlled by the controller 320 to output instructions to the location 108.

As depicted, the memory 322 stores an application 323, that, when executed by the controller 320, enables the controller 320 to provide a notification of a route to the location 108. In the examples described herein, when the controller 320 executes the application 323, the controller 320 is enabled to: receive, from the device 101, via the interface 324, a route to a location (for example the location 108); and control a notification device, such as the display device 326 and/or the speaker device 329, to provide a notification of the route to the location, for example as visual and/or audio instructions.

In some implementations, when the controller 320 executes the application 323, the controller 320 is further enabled to: transmit a current location to the device 101 (e.g. as determined by the location determining device 350), for example periodically and/or upon receiving a request for a current location from the device 101, via the interface 324.

In some implementations, when the controller 320 executes the application 323, the controller 320 is further enabled to: when the route to a location is received, control the one or more evidence collection devices 370 to automatically collect data, including, but not limited to, camera data, video data, audio data and the like. The data collected by the one or more evidence collection devices 370 may be stored at the memory 322 and/or streamed to the device 101 and/or the other communication devices 103 being dispatched to the location.

The controller 320 may hence be generally configured to communicate with the device 101, and the like, to both receive dispatch commands, and to provide the device 101 with a respective current location (e.g. as determined using the location determining device 350). The controller 320 may be further configured to communicate with the other communication devices 103 being dispatched to a location, for example using radio communications and/or communications used to stream data collected by the one or more evidence collection devices 370. Such streaming to the other communication devices 103 being dispatched to a location may also occur via the device 101.

Figure 4:
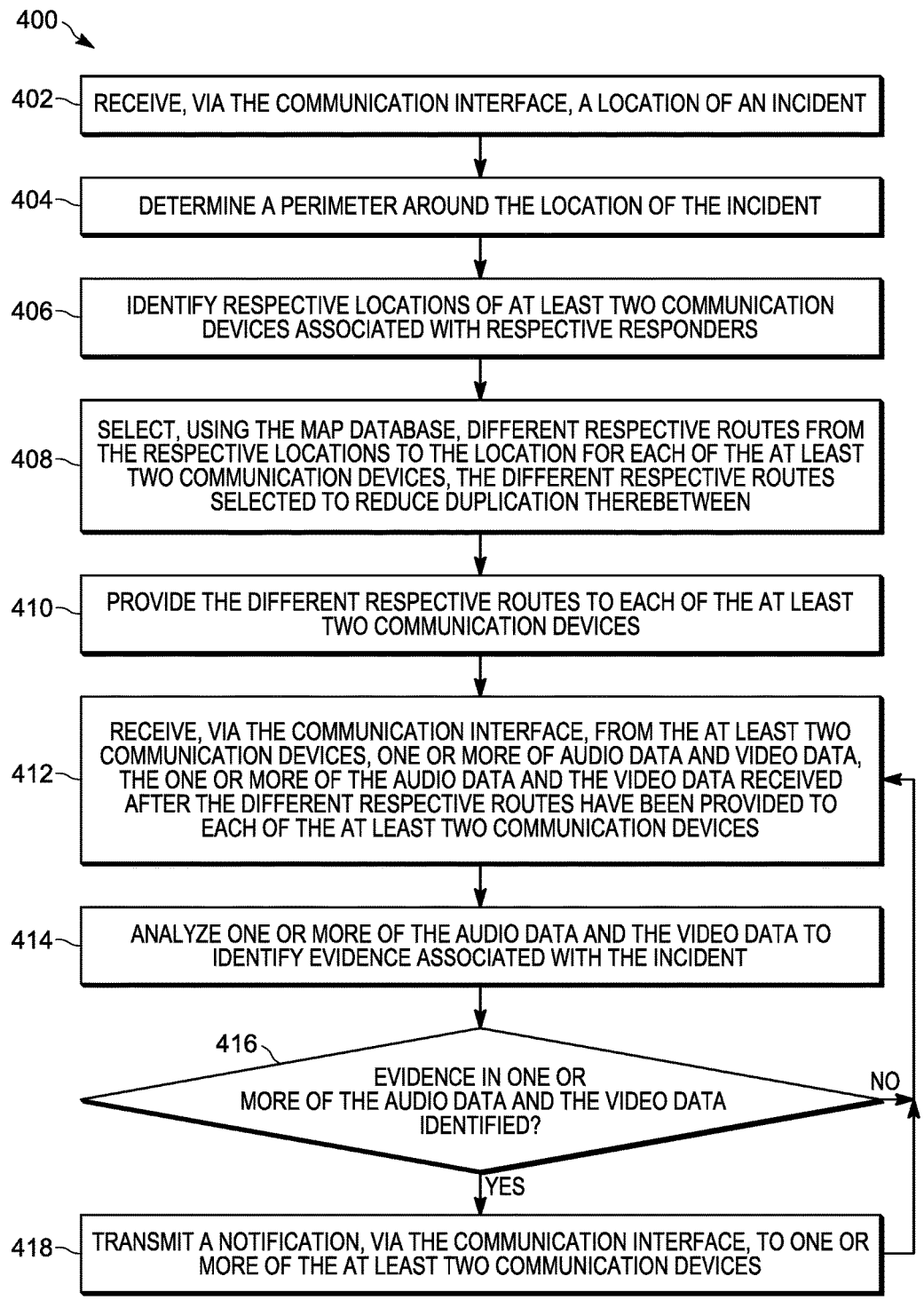
FIG. 4 is a flowchart of a method of electronically dispatching responders in accordance with some embodiments.

Attention is now directed to FIG. 4 which depicts a flowchart representative of a method 400 for dispatching devices. In some embodiments, the operations of the method 400 of FIG. 4 correspond to machine readable instructions that are executed by, for example, the device 101 of FIG. 1, and specifically by the controller 220 of the device 101. In the illustrated example, the instructions represented by the blocks of FIG. 4 are stored at the memory 222, for example, as the application 223. The method 400 of FIG. 1 is one way in which the device 101 and/or the controller 220 and/or the system 100 is configured. Furthermore, the following discussion of the method 400 of FIG. 4 will lead to a further understanding of the system 100 and the device 101, and its various components.

However, it is to be understood that the device 101 and/or the controller 220 and/or the method 400 and/or the system 100 may be varied, and need not work exactly as discussed herein in conjunction with each other, and that such variations are within the scope of present embodiments.

Furthermore, the method 400 of FIG. 4 need not be performed in the exact sequence as shown and likewise various blocks may be performed in parallel rather than in sequence. Accordingly, the elements of method 400 are referred to herein as "blocks" rather than "steps".

At a block 402, the controller 220 receives, via the communication interface 224, a location of an incident (e.g. as received in the report 110).

At an optional block 404, the controller 220 determines a perimeter around the location of the incident (e.g. using the map database 232 and/or based on an incident type).

At a block 406, the controller 220 identifies respective locations 109 of at least two communication devices 103 associated with respective responders (e.g. inside the perimeter determined at the block 404).

At a block 408, the controller 220 selects, using the map database 232, different respective routes from the respective locations 109 to the location 108 for each of the at least two communication devices 103, the different respective routes selected to reduce duplication therebetween. For example, in some embodiments, a fastest route and/or a shortest route is selected for the first communication device 103-1, and a respective route is selected for the second communication device 103-2 that reduced duplication with the route selected for the first communication device 103-1.

At a block 410, the controller 220 provides the different respective routes to each of the at least two communication devices 103.

At an optional block 412, the controller 220 receives, via the communication interface 224, from the at least two communication devices 103, one or more of audio data and video data, the one or more of the audio data and the video data received after the different respective routes have been provided to each of the at least two communication devices 103.

At an optional block 414, the controller 220 analyzes one or more of the audio data and the video data to identify evidence associated with the incident at the location 108.

At an optional block 416, the controller 220 determines whether any evidence in one or more of the audio data and the video data has been identified. When any evidence in one or more of the audio data and the video data has been identified (e.g. a "YES" decision at the block 416), at an optional block 418, the controller 220, transmits a notification, via the communication interface 224, to one or more of the at least two communication devices 103. The controller 220 continues to receive and analyze audio data and/or video data at the blocks 412, 414, 416.

Otherwise, when no evidence in one or more of the audio data and the video data has been identified (e.g. a "NO" decision at the block 416), the controller 220 continues to receive and analyze audio data and/or video data at the blocks 412, 414, 416.

When the method 400 includes the blocks 412, 414, 416, 418, the controller 220 continues to implement the blocks 412, 414, 416, 418 until no further audio data and/or video data is received and the method 400 ends.

Example embodiments of the method 400 will now be described with respect to FIG. 5 to FIG. 14.

Figure 5:
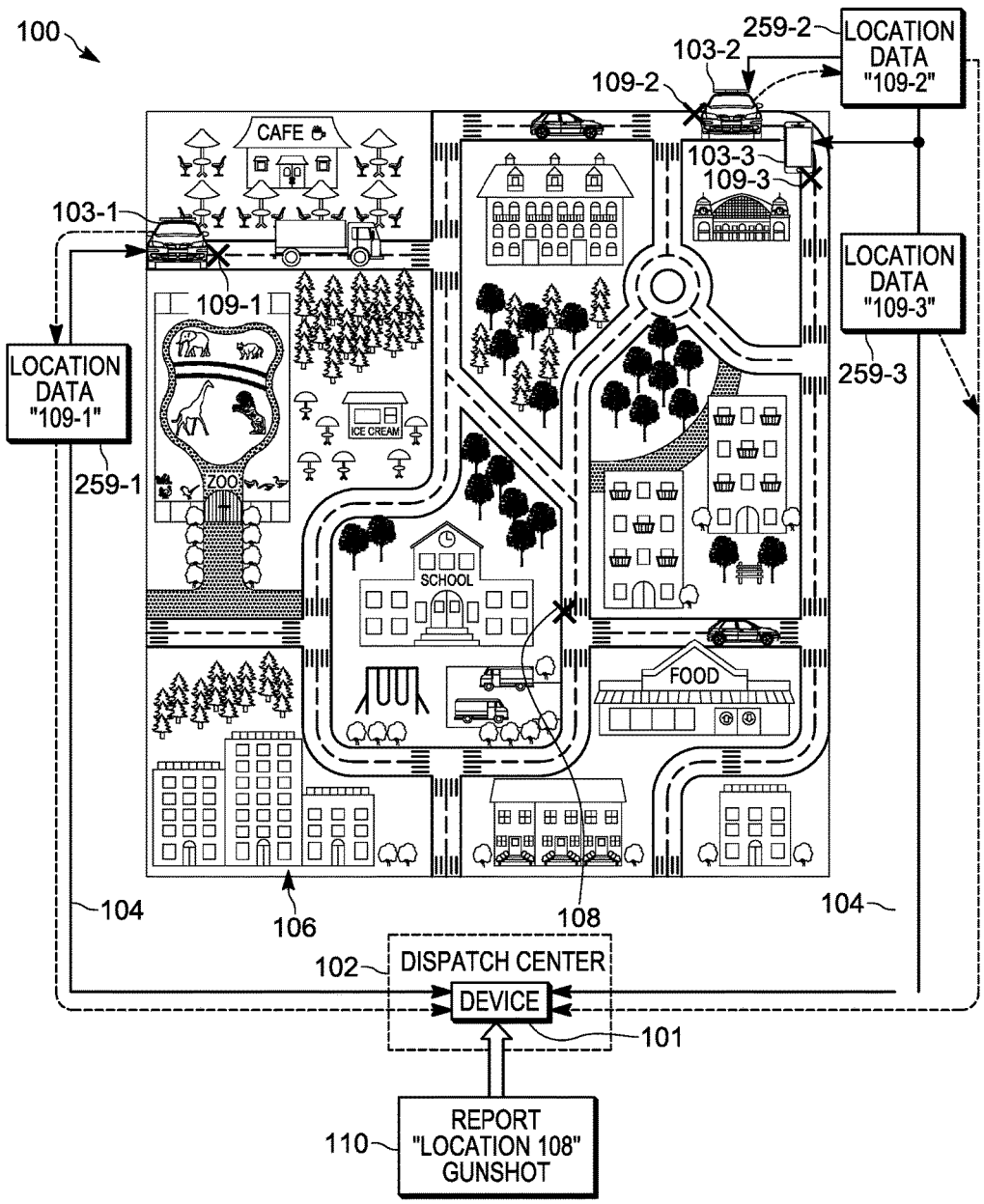
FIG. 5 depicts the dispatch device of the system of FIG. 1 identifying locations of communication devices in accordance with some embodiments.
Figure 6:
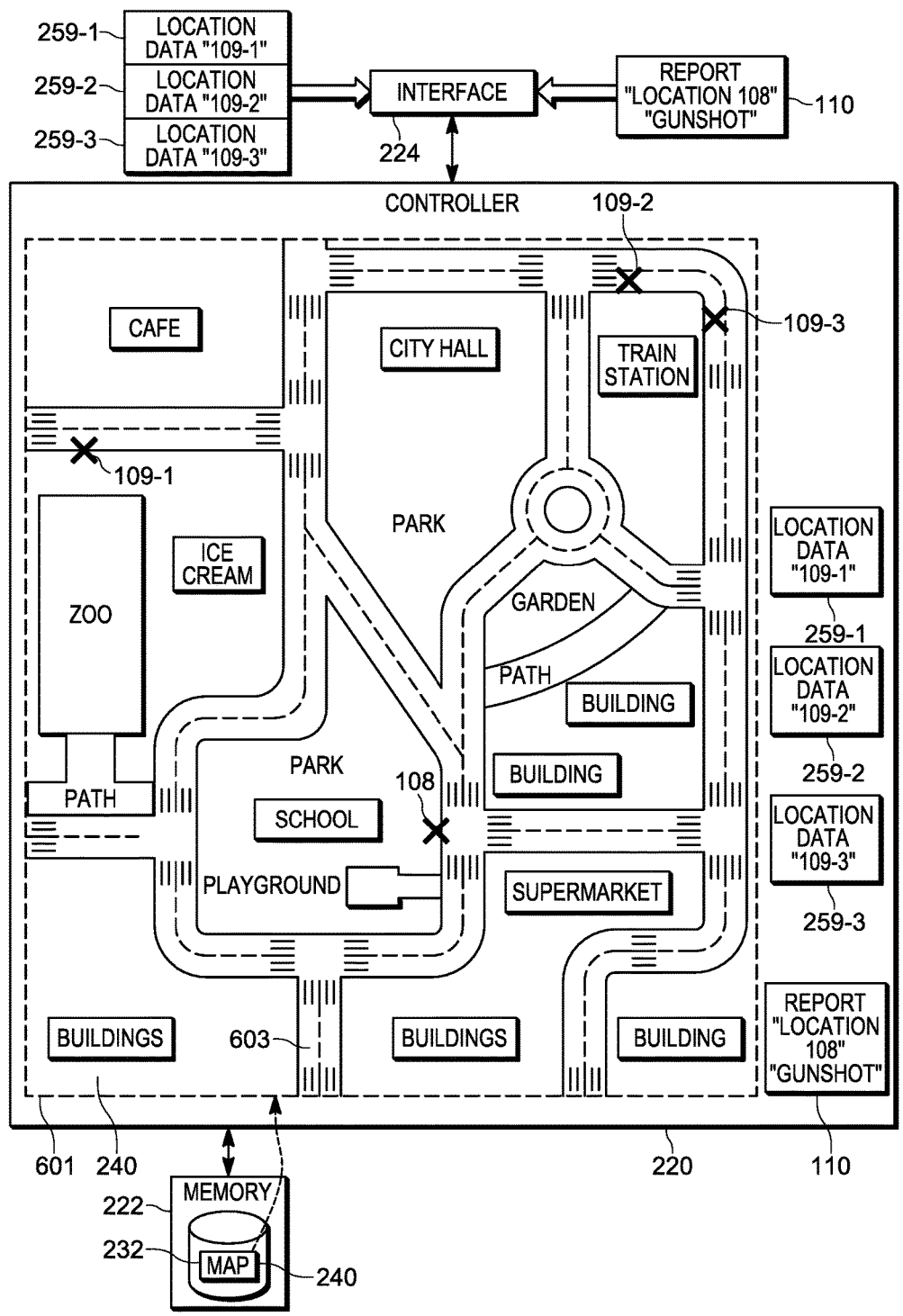
FIG. 6 depicts the dispatch device of the system of FIG. 1 receiving a location of an incident and determining a perimeter around the location in accordance with some embodiments.

Attention is next directed to FIG. 5 and FIG. 6 which depicts an example embodiment of the blocks 402, 404, 406 of the method 400. FIG. 5 is substantially similar to FIG. 1, with like elements having like numbers. FIG. 6 depicts a portion of the device 101 including the controller 220, the memory 222 storing the database 232 and the map 240, and the interface 224. While not depicted in FIG. 6, it is assumed that the remaining components of the device 101 are nonetheless present; similarly, while only the database 232 and the map 240 are depicted at the memory 222, it is assumed that the remaining items depicted in FIG. 2 are also stored at the memory 222.

In each of FIG. 5 and FIG. 6, the device 101 is again depicted as receiving (e.g. at the block 402 of the method 400) the report 110 that includes an indication "Location 108" of the location 108 of the incident and an incident type "Gunshot"; as depicted in FIG. 6, the report 110 is received at the controller 220 via the interface 224.

FIG. 6 hence depicts the controller 220 loading the map 240 from the map database 232, locating the location 108 on the map 240, and determining (e.g. at the block 404) a perimeter 601 around the location 108. The controller 220 may be further configured to convert the indication "Location 108" of the location 108 to coordinates compatible with the map 240 (e.g. convert a street address to GPS coordinates, and the like).

The map 240 as depicted in FIG. 6 is similar to the geographic region 106 depicted in FIG. 1, however the map 240 is in a map format, with map features, such as roads 603, a cafe, a train station, a zoo, a park, a playground, a city hall, a supermarket, pedestrian paths (e.g. "Path") and buildings indicated schematically. Such map features generally correspond to the geographic features of the geographic region 106. Other map features may include, but are not limited to, a river, a sea, a lake, a pond, an ocean, a beach, and/or other water features, and the like. Indeed, any other geographical features that may be provided at a map are within the scope of present implementations including, but not limited to, airports, bus stations, helicopter pads, and the like.

The perimeter 601 may be determined based on an incident type, for example a "Gunshot". Indeed, the application 223 and/or the memory 222 may include a look-up table (not depicted) that includes a perimeter size for different incident types. For example, a "Kidnapping" may be associated with a larger perimeter than a "Gunshot", and a "Murder" have a smaller perimeter than a "Gunshot". Regardless, a perimeter size for an incident type may be determined heuristically and stored at the memory 222. Furthermore, a perimeter size and/or shape may be defined with respect to a radius, and the like, from a location of an incident, a number of city blocks, and the like, in various directions from a location of an incident. As depicted, the perimeter 601 has been determined assuming about one to two city blocks in perpendicular directions from the location 108. However, the perimeter size and/or shape may alternatively comprise an abstract shape that includes an area that may depend on one or more of: the type of incident, a mode of a reported escape transportation (e.g. of a criminal from the location 108), a geographical landscape of an area of a reported incident (e.g. the geographical landscape of the geographical region 106). Furthermore, a perimeter size and/or shape may be updated and/or changed based on any updated information received in further reports and/or inputs received from a deployed responder and/or responder team.

Furthermore, in some implementations, the perimeter 601 is not based on an incident type, but rather is a default perimeter size used for all incidents and/or incident types.

Furthermore, the map 240 may be extracted from a larger map of a region that includes the location 108. Hence, once the location 108 is received along with an incident type, the controller 220 may extract the map 240 from the map database 232 based on the location 108 and the perimeter 601.

FIG. 5 and FIG. 6 further depict the device 101 receiving the location data 259 from the communication devices 103 via the links 104 and the interface 224 to identify (e.g. at the block 406 of the 400) respective locations 109 of at least two communication devices 103 associated with respective responders. When the perimeter 601 is determined, the controller 220 identifies (e.g. at the block 406 of the 400) respective locations 109 of at least two communication devices 103 associated with respective responders located within the perimeter 601. Alternatively, the block 406 may be implemented at the device 101 without receiving the location data 259 based, for example, on triangulation techniques (e.g. by receiving data from cell phone towers and the like).

Figure 7:
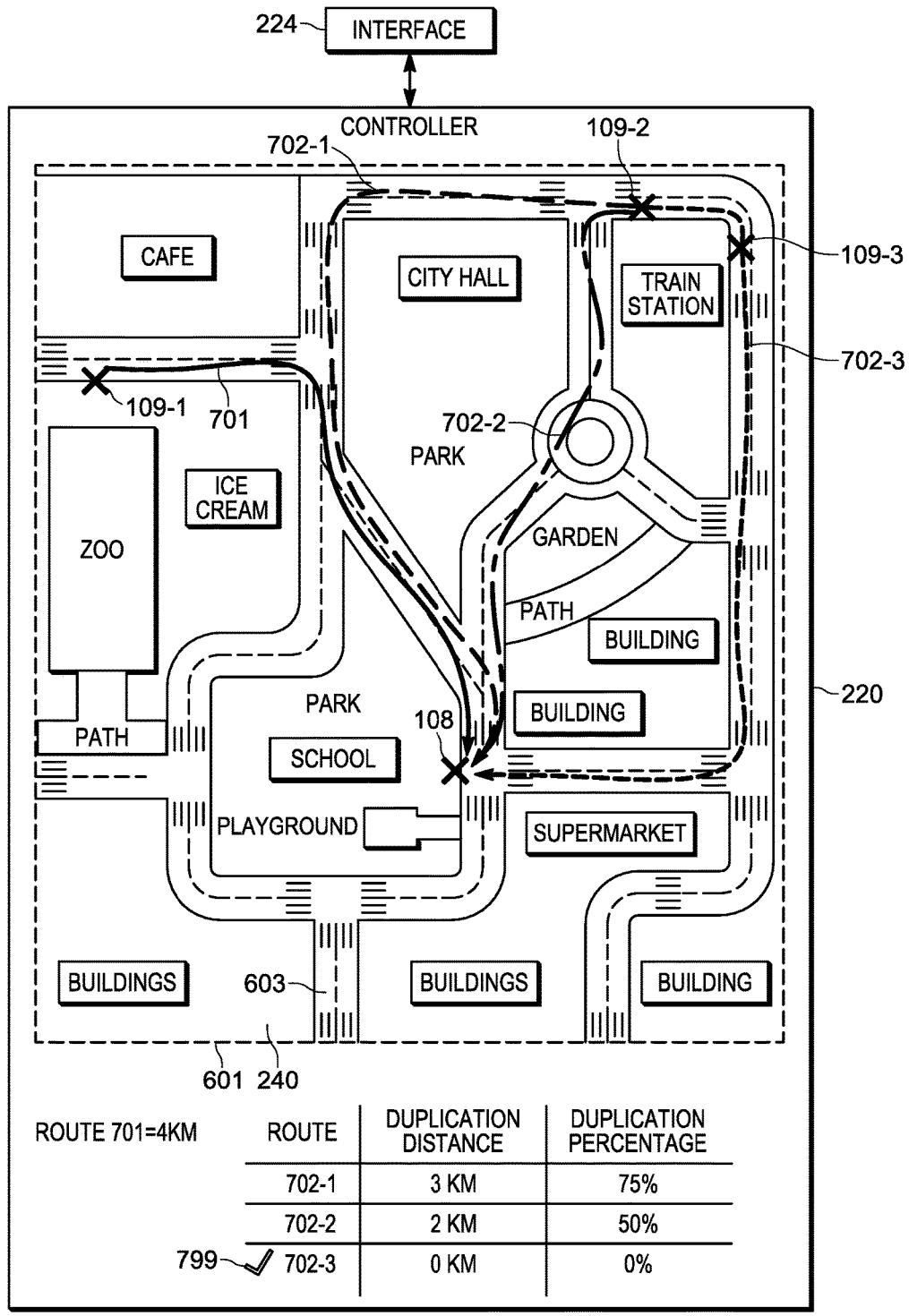
FIG. 7 depicts the dispatch device of the system of FIG. 1 selecting different respective routes from respective locations of the communication devices to the location for each of the at least two communication devices in accordance with some embodiments.

Attention is next directed to FIG. 7, which depicts the controller 220 of the device 101 implementing an example embodiment of the block 408. As in FIG. 6, it is assumed that the remaining components of the device 101 are present. Furthermore, the block 408 will be described with respect to the controller 220 selecting, using the map database 232 (e.g. in the form of the map 240), different respective routes from the respective locations to the location for each of the two communication devices 103-1, 103-2, the different respective routes selected to reduce duplication. In other words, responder associated with the communication device 103-3 is initially not deployed to the location 108.

As depicted in FIG. 7, the controller 220 has selected a fastest route 701 for the first communication device 103-1 from the location 109-1, to the location 108 of the incident based, for example, on streets 603 that a vehicle may utilize between the locations 109-1, 108. The fastest route 701 can comprise the shortest route between the locations 109-1, 108 and/or the fastest route 701 may be selected based on traffic between the locations 109-1, 108, assuming that the device 101 further has access to a traffic server (not depicted). Furthermore, the route 701 may be determined using any route selection algorithm that determines a fastest and/or shortest route between two locations on a map; the application 223 hence includes any such algorithm and/or combination of algorithms that will enable the controller 220 to determine the route 701. The route 701 may further be determined based on a mode of transportation and/or map features; for example, while in the present example the communication device 103-1 comprises a vehicle, when a communication device 103 is being carried by a responder on foot, on a bicycle, and the like, the route 701 may include pedestrian paths rather than only the streets 603.

FIG. 7 further depicts the controller 220 determining a plurality of routes 702-1, 702-2, 702-3 (interchangeably referred to hereafter, collectively, as the routes 702 and generically as a route 702) between the location 109-2 of the communication device 103-2 and the location 108. While only three routes 702 are determined, the controller 220 may determine any number of routes 702 between the location 109-2 of the communication device 103-2 and the location 108; in some embodiments, as depicted, the controller 220 determines the three shortest routes 702, for example to save computational resources.

The controller 220 then compares each of the routes 702 to the route 701 to determine a portion of each of the routes 702 that duplicate the route 701. For example, as depicted, the controller 220 determines that the route 701 is 4 km long, and further determines a length of a portion of each of the routes 702 that duplicate and/or overlap with and/or coincide with the route 702. As depicted, the route 702-1 duplicates 3 km (or 75%) of the route 701, the route 702-2 duplicates 2 km (or 50%) of the route 701, and the route 702-3 duplicates 0 km (or 0%) of the route 701.

Hence, the controller 220 selects route 702-3 from the plurality of routes 702 that reduces duplication and/or overlap between the routes 702 and the route 701. As depicted, the controller 220 selects a respective route 702-3, from the plurality of routes 702, for the second communication device 103-1, having a smallest duplication with a fastest route 701 for the first communication device 103-1.

Put another way, as depicted, the first route 701, of the different respective routes for the two communication devices 103, is a fastest route for a first communication device 103-1, and a second route 702-3, of the different respective routes, for a second communication device 103-2 is selected by comparing a plurality of routes 702 for the second communication device 103-2 with the fastest route 701 and using weighting metrics to reduce duplication therebetween. For example, as depicted, the route 702-3 is given a higher weight than the other routes 702-1, 702-2.

In any event, the controller 220 selects (as indicated via the checkmark 799) the route 702-3 for the communication device 103-2 regardless of whether the other routes 702-1, 702-2 are faster and/or shorter.

While the block 408 has been described with respect to the controller 220 first selecting the fastest route 701 to the location 108 for the communication device 103-1, and using the fastest route 701 to the location 108 for the communication device 103-1 as a comparison for the routes 702, in other embodiments, the controller 220 may initially determine the fastest respective route to the location 108 for each of the communication devices 103. In these embodiments, of the fastest respective routes to the location 108 for each of the communication devices 103, the fastest overall route, of these fastest respective routes, is initially selected to assign to a respective communication device 103, and a plurality of routes for the other communication device 103 are generated and compared against the fastest overall route. Hence, in some embodiments, at least one of the different respective routes (e.g. from the locations 109-1, 109-2 to the location 108) comprises a fastest route from a respective location 109 of a respective communication device 103 to the location 108.

Figure 8:
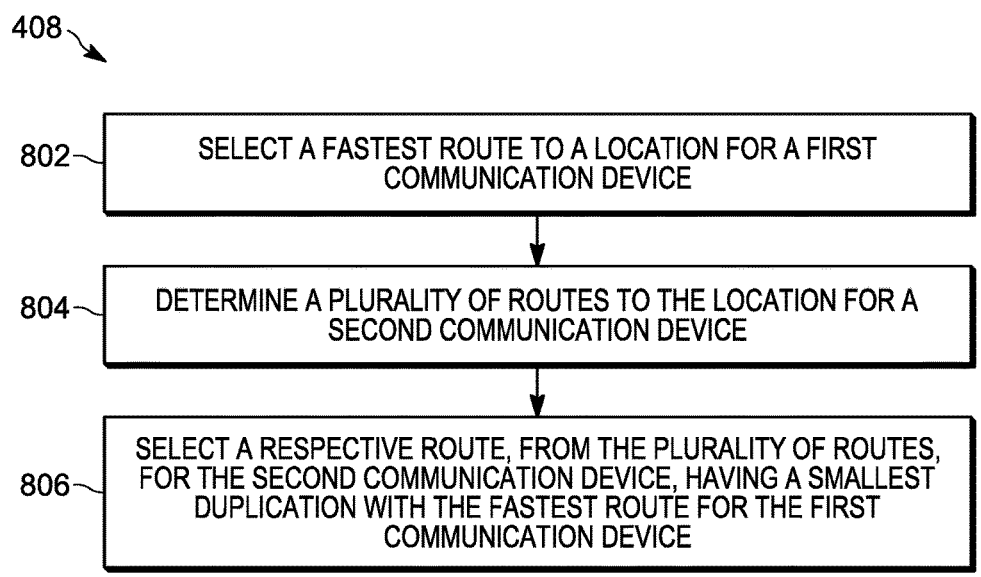
FIG. 8 is a flowchart of a method of electronically dispatching responders to reduce route duplication therebetween, including a fastest route, in accordance with some embodiments.

For example, attention is next directed to FIG. 8 which depicts an example embodiment of the block 408 of the method 400. At a block 802, the controller 220 selects a fastest route to a location for a first communication device 103, which may be the fastest route to the location of all the communication devices 103 (e.g. within a perimeter). At a block 804, the controller 220 determines a plurality of routes to the location for a second communication device 103. And at the block 806, the controller 220 selects a respective route from the plurality of routes, for the second communication device 103, having a smallest duplication with the fastest route for the first communication device 103.

Figure 9:
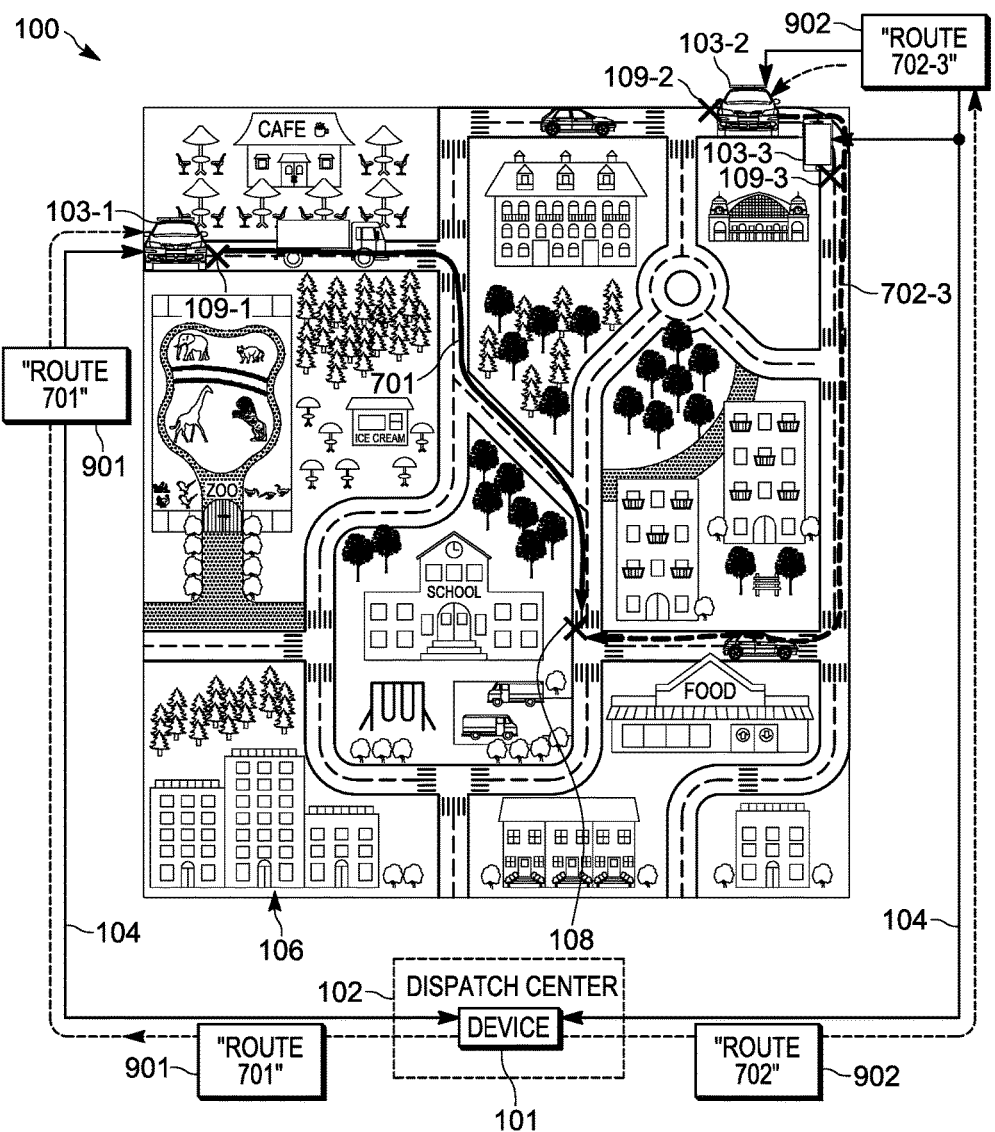
FIG. 9 depicts the dispatch device of the system of FIG. 1 electronically dispatching responders to a location in accordance with some embodiments.

Attention is next directed to FIG. 9 which is substantially similar to FIG. 5, with like elements having like numbers. The device 101 generates data 901, 902 respectively including an indication (e.g. "Route 701", "Route 702-3") of each of the routes 701, 702-3. and provides the respective routes 701, 702-3 to each of the communication devices 103-1, 103-2 by transmitting the data 901 (with the indications "Route 701", "Route 702-3"), respectively to the communication devices 103-1, 103-2. The indications "Route 701", "Route 702-3" may include instructions to the location 108 along each of the routes 701, 702-3, street addresses, GPS coordinates, and the like, defining the routes 701, 702-3, and the like. Either way, indications "Route 701", "Route 702-3" may be compatible with each of the communication devices 103-1, 103-2 and/or the communication devices 103-1, 103-2 may be configured to convert the instructions into coordinates compatible with their respective components.

In general, the data 901, 902 is received at a respective controller 320 of each of the communication devices 103-1, 103-2, which may then automatically control a respective display device 326 and/or a respective speaker device 329 to provide instructions to navigate to the location 108 using the data 901 or the data 902. Each of the communication devices 103-1, 103-2 may then proceed to be navigated and/or transported to the location 108 along the respective routes 701, 702-3, for example collecting evidence using the respective evidence collection device(s) 370 and/or ensuring that more than one escape route from the location 108 is covered, thereby increasing the possibility of encountering a criminal responsible for the incident.

When the device 101 comprises one of the communication devices 103 (e.g. a communication device 103 is determining routes for itself and other communication devices 103), the block 410 may include the device 101 generating the data 901, 902 and using a set of the data 901, 902 to navigate to the location 108.

Furthermore, in some embodiments, the data 901 is determined prior to the data 902, as the route 701 may be determined prior to the route 702-3 (e.g. due to the comparison of the routes 702 with the route 701). In these embodiments, the data 901 may be transmitted to the communication device 103-1 as soon as the data 901 is determined in order to dispatch the communication device 103-1 to the location 108 as soon as possible and/or prior to transmitting the data 902. Such an embodiment causes the communication device 103-1 to be dispatched quickly in order to efficiently respond to the incident at the location 108.

Figure 10:
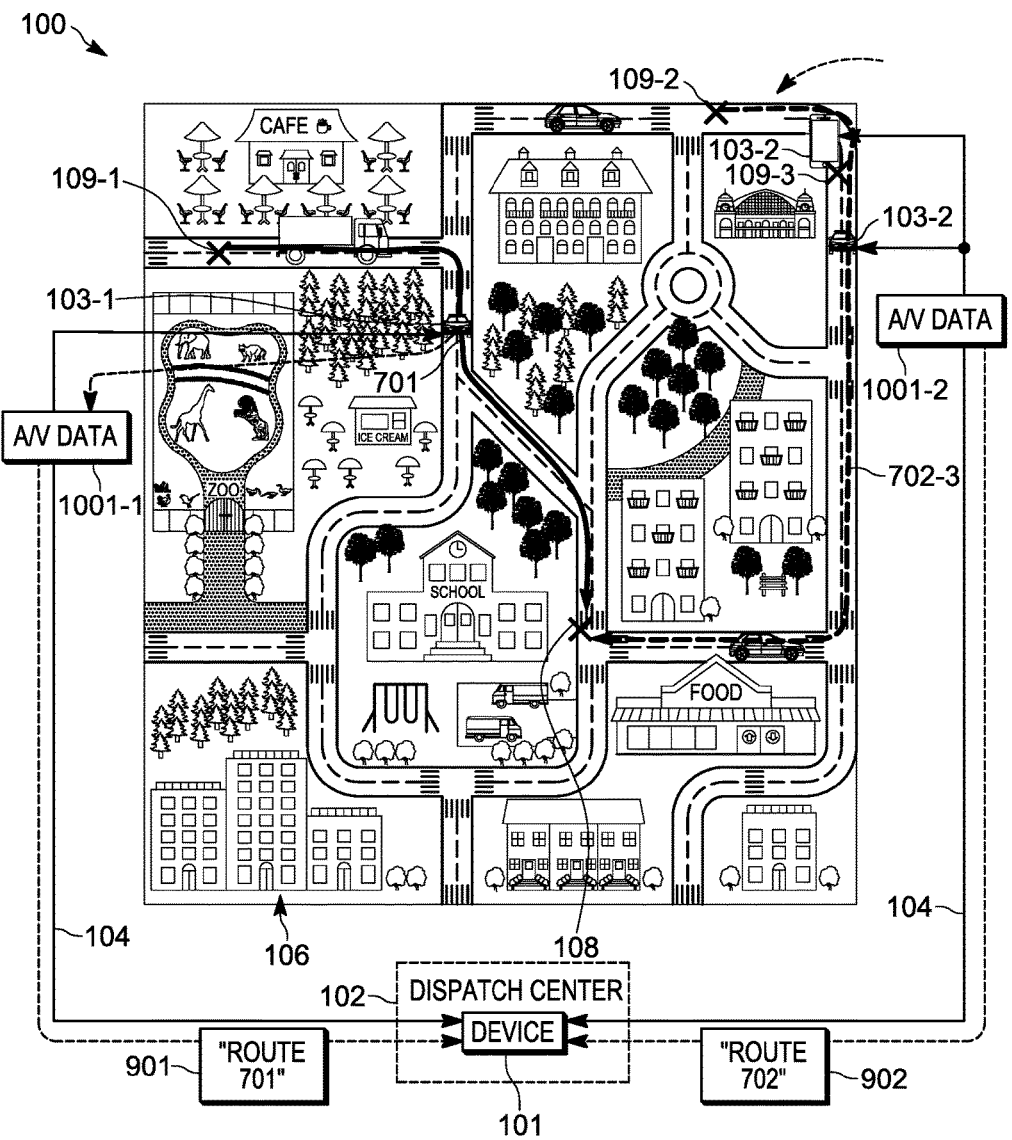
FIG. 10 depicts the communication devices of the system of FIG. 1 providing one or more of audio data and video data to the dispatch device in accordance with some embodiments.

Attention is next directed to FIG. 10 which is substantially similar to FIG. 9, with like elements having like numbers, however, in FIG. 10, each of the communication devices 103-1, 103-2 are enroute to the location 108 via their respective routes 701, 702-3. For example, as each of the communication devices 103-1, 103-2 are vehicles, the communication devices 103-1, 103-2 are being driven by a respective responder.

Furthermore, in FIG. 10, each of the communication devices 103-1, 103-2 is acquiring audio data and/or video data 1001-1, 1001-2 (interchangeably referred to respectively as A/V Data 1001-1, 1001-2, and collectively, hereafter as A/V Data 1001) while navigating the respective routes 701, 702-3, for example using the respective evidence collection device(s) 370. The A/V data 1001 is being transmitted to the device 101 via the links 104.

Figure 11:
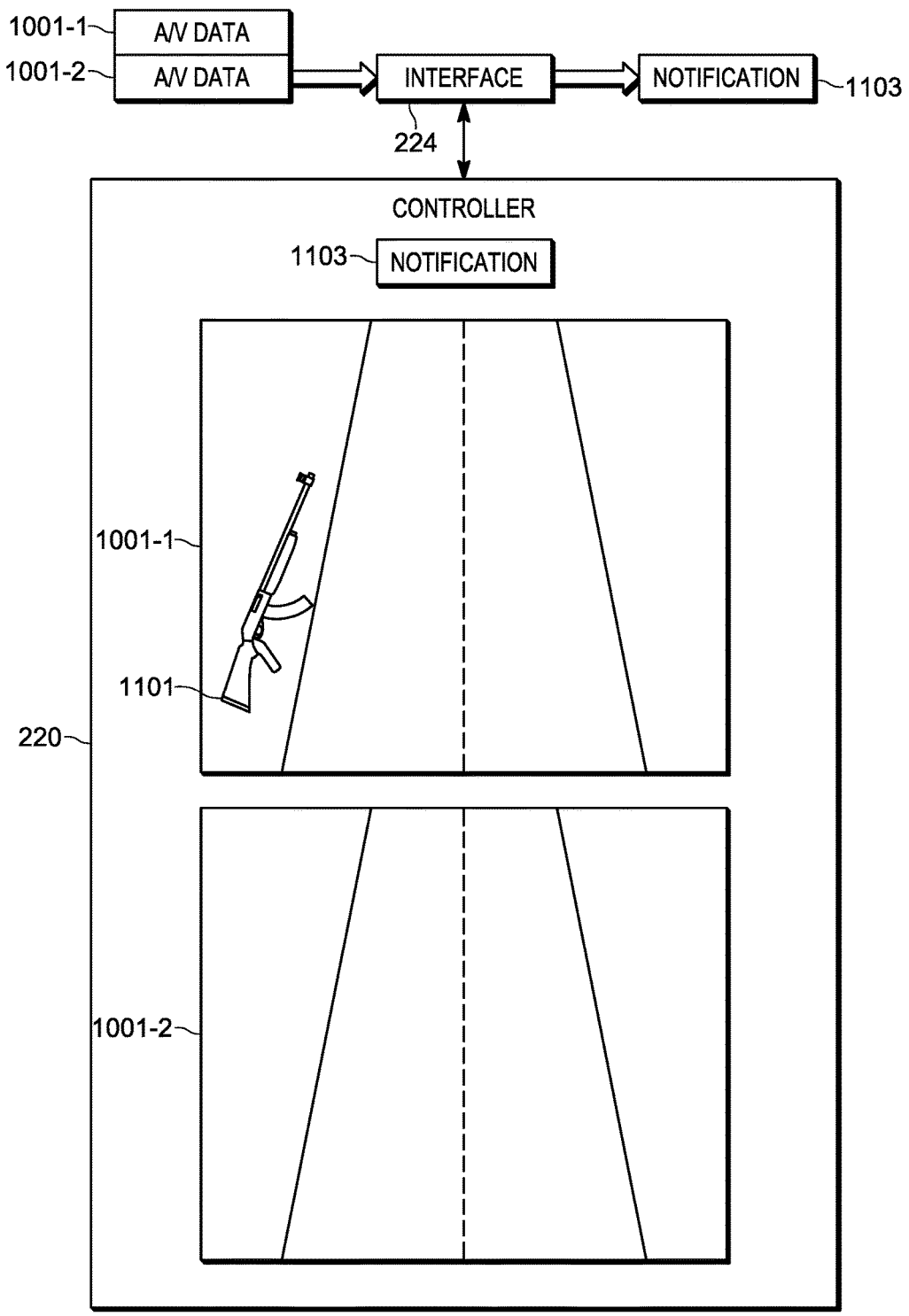
FIG. 11 depicts the dispatch device of the system of FIG. 1 identifying evidence in one or more of audio data and video data in accordance with some embodiments.
Figure 12:
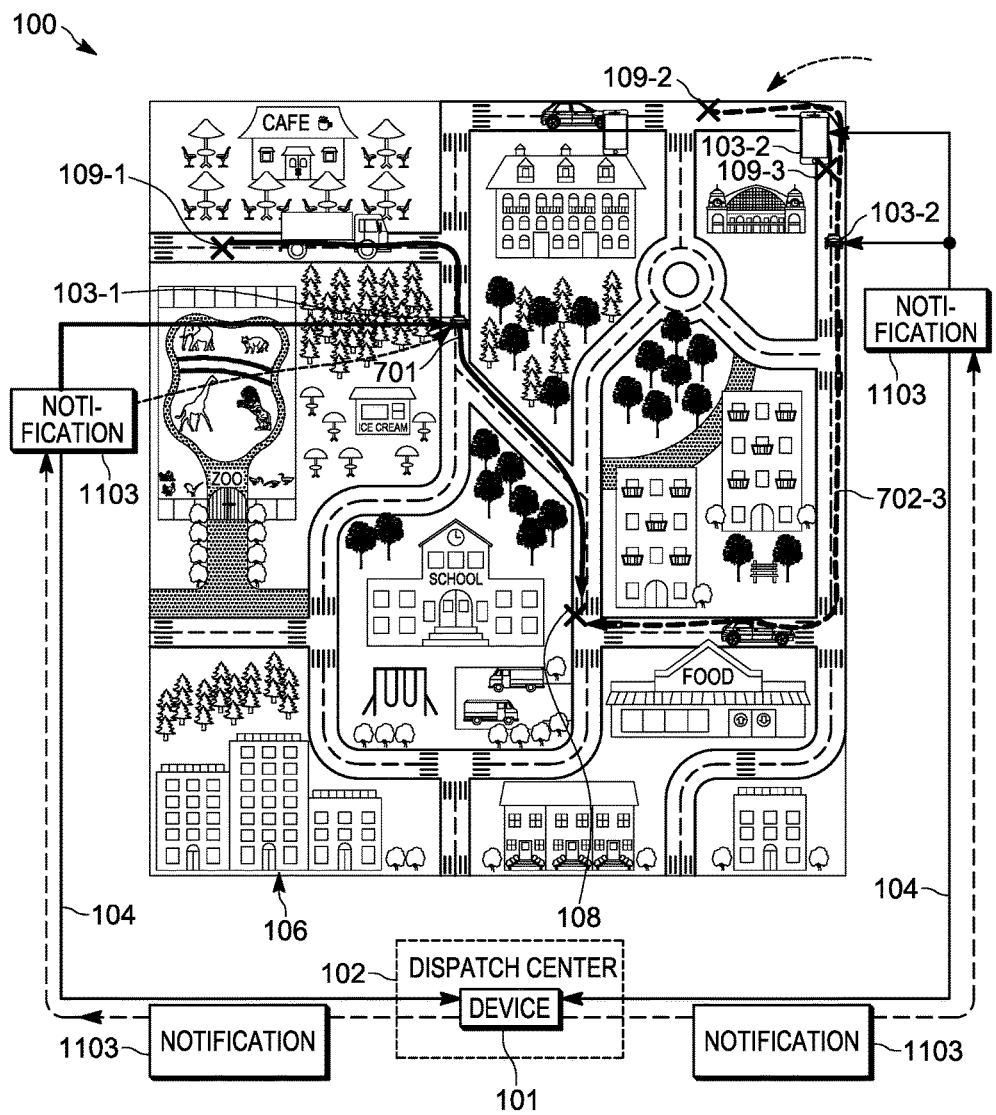
FIG. 12 depicts the dispatch device of the system of FIG. 1 notifying the communication devices of evidence identified in one or more of audio data and video data in accordance with some embodiments.

Attention is next directed to FIG. 11 which depicts the controller 220 of the device 101 implementing an example embodiment of the blocks 412, 414, 416, 418. As in FIG. 7, it is assumed in FIG. 11 that the remaining components of the device 101 are present. In FIG. 11, the controller 220 is receiving (e.g. at the block 412) via the communication interface 224, from the at least two communication devices 103-1, 103-2, one or more of audio data and video data (e.g. the A/V data 1001, the one or more of the audio data and the video data received after the different respective routes have been provided to each of the at least two communication devices 103-1, 103-2.

Furthermore, an example of each of the A/V data 1001-1, 1001-2 is depicted at the controller 220. In particular, each of the A/V data 1001-1, 1001-2 includes an image of a respective road along each of the routes 701, 702-3. Along the road depicted in the A/V data 1001-2, no evidence is found. However, along the road depicted in the A/V data 1001-1, an image 1101 of a gun is identified. Indeed, the controller 220 may be generally configured to use image analysis techniques (e.g. by implementing the application 223) to determine whether evidence is present in the A/V data 1001 using, for example, reference images and/or reference data, and the like, which define reference "evidence". Hence, FIG. 11 further depicts the controller 220 analyzing (e.g. at the block 414) the A/V data 1001 to identify evidence associated with the incident to which the communication devices 103-1, 103-2 are enroute.

As evidence has been identified in the A/V data 1001-1 (e.g. a "YES" decision occurs at the block 414 of the method 400), the controller 220 generates a notification 1103 and transmits (e.g. at the block 416 of the method 400) the notification 1103, via the communication interface 224, to one or more of the two communication devices 103-1, 103-2. Such a transmission is further depicted in FIG. 12, which is substantially similar to FIG. 10, with like elements having like numbers.

For example, the notification 1103 may instruct the communication device 103-1 to collect the evidence represented by the image 1101 and/or redirect the communication devices 103-1, 103-2 to routes that include a location where the evidence was identified.

While the example in FIG. 11 was described with respect to the evidence being a gun, the controller 220 may be configured to identify other types of evidence including, but not limited to, one or more of discarded disguises, weapons (e.g. guns, knives, and the like), cloth and objects associated with criminal activity, given vehicle types (e.g. a vehicle of a criminal which may also be indicated in the report 110), license plate numbers, and the like.

In some embodiments, least one of the different respective routes selected by the controller 220 for a communication device 103 is based on one or more of: a mode of transportation associated with a respective communication device 103; map features within a perimeter around the location 108.

Figure 13:
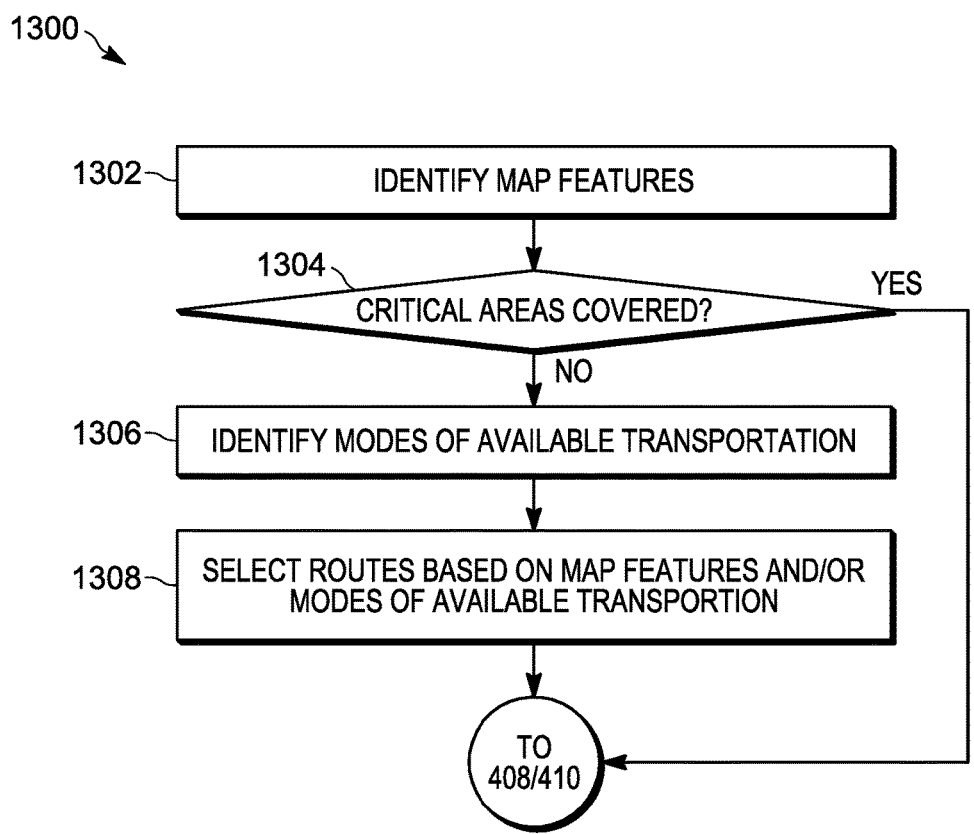
FIG. 13 is a flowchart of a method of selecting a route based on one or more of map features and modes of available transportation in accordance with some embodiments.

For example, attention is now directed to FIG. 13 which depicts a flowchart representative of a method 1300 for dispatching devices. The method 1300 may be implemented in conjunction with and/or as an embodiment of the block 408 of the method 400, in addition to, and/or in conjunction with, the blocks 802, 804, 806 of FIG. 8. Alternatively, the method 1300 may be implemented after evidence has been identified at the block 416 to dispatch further responders. Either way, the method 1300 may be incorporated in to the method 400.

It is hence assumed in the method 1300 that the device 101 and/or the controller 220 has: received the location 108 and determined the perimeter 601

At a block 1302, the controller 220 identifies map features, for example using the map 240 within the perimeter 601, as described above.

At a block 1304, the controller 220 determines whether critical areas are covered, for example by existing determined routes 701, 702-3 within the perimeter 601. In particular, different map features may be associated with different critical area types. For example, map features such as a park, a playground, pedestrian paths, a train station, a river, a sea, a lake, a pond, an ocean, a beach, an airport, a bus station, a helicopter pad and the like may be designated as a critical area in a lookup table stored at the memory 222. For example, such critical areas may include areas of the geographic region 106 that is inaccessible to police cars, but may be accessible to police officers on foot, on a bicycle, on a motorcycle, on a boat and the like.

When critical areas are not covered, and/or there are no critical areas within the perimeter 601, a "YES" decision occurs at the block 1304, and the method 400 continues, for example at the block 408 and/or the block 410. For example, as will be described hereafter, a critical area may be determined to be covered when police officers and/or responders on foot, and the like, have already been dispatched to critical areas, either using the method 400 and/or another dispatching technique; hence, in some implementations, the device 101 may dispatch responders on foot using conventional techniques (e.g. manually) and the device 101 may keep a record of such a dispatch that may be used by the controller 220 at the block 1304.

However, when one or more critical areas are not covered (e.g. a "NO" decision at the block 1304), at a block 1306, the controller 220 identifies modes of available transportation for the communication devices 103 and, at the block 1308 the controller 220 selects routes for the communication devices 103 based on one or more of the map features and the modes of available transportation. The method 400 continues, for example at the block 408 and/or the block 410.

Figure 14:
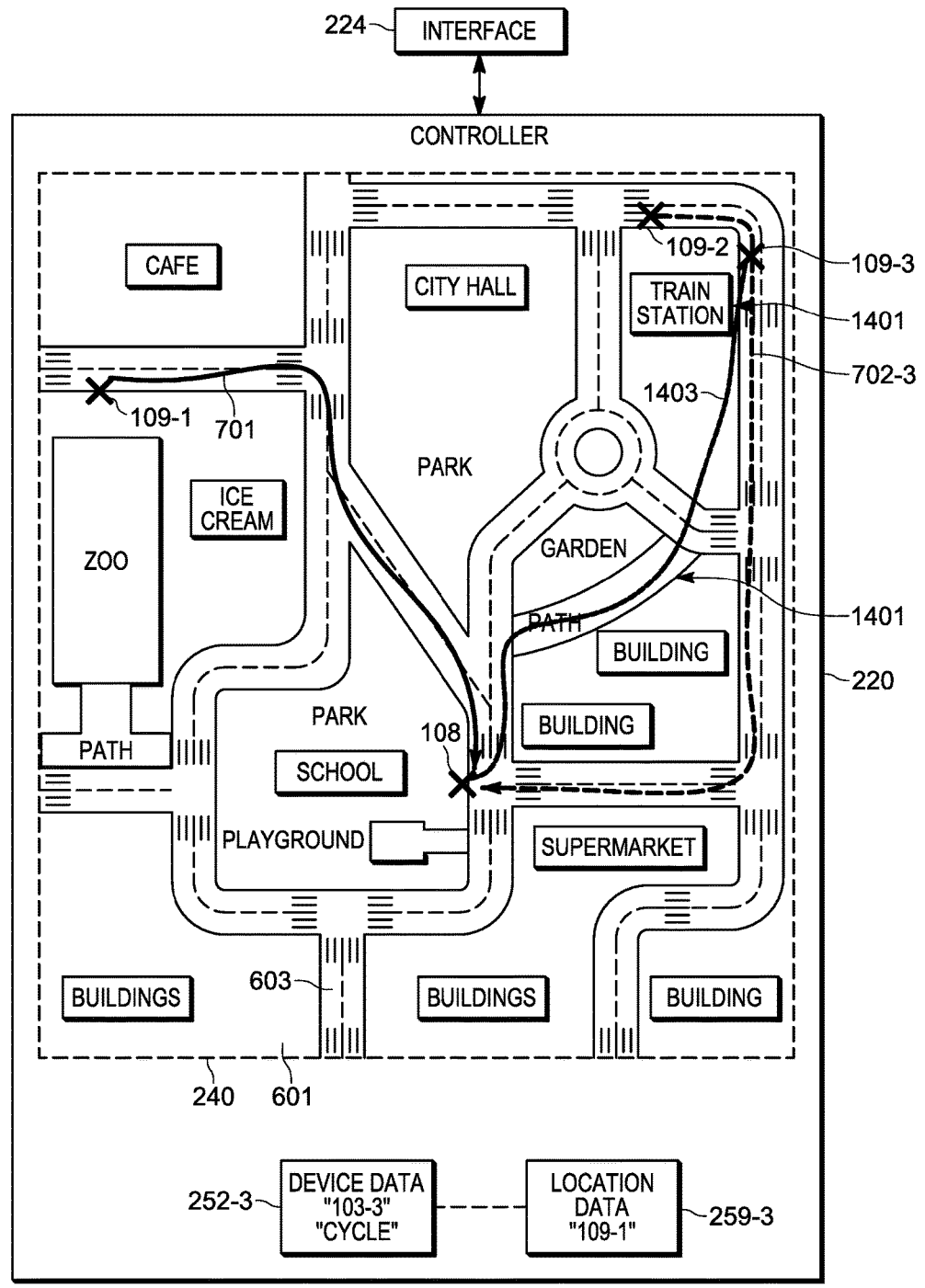
FIG. 14 depicts the dispatch device of the system of FIG. 1 selecting a route based on one or more of map features and modes of available transportation in accordance with some embodiments.

For example, attention is next directed to FIG. 14 which depicts an example embodiment of the method 1300. FIG. 14 is substantially similar to FIG. 7 with like elements having like numbers. In particular, in FIG. 14, the controller 220 has determined the routes 701, 702-3 and dispatched the communication devices 103-1, 103-2 to the location 108 as described above. However, in FIG. 14, the controller 220 identifies (e.g. at the blocks 1302, 1304) that critical areas 1401 are present in the perimeter, assuming that the map features of a train station and a pedestrian path are critical areas. For example, a criminal fleeing the location 108 may use a pedestrian path designated as a critical area 1401 to get to a train station also designated as a critical area 1401. As the communication devices 103-1, 103-2 are vehicles, and have been dispatched along routes 701, 702-3 that coincide with streets 603, the communication devices 103-1, 103-2 can neither be dispatched through the critical areas 1401, nor can the communication devices 103-1, 103-2 acquire evidence in the critical areas 1401.

Hence, at the block 1306, the controller 220 identifies modes of available transportation, for example by loading the device data 252-3 and the associated location data 259-3 and determines that the communication device 103-3 at the location 109-3 is associated with a mode of associated transportation (e.g. "cycle") that could be used to navigate through the critical areas 1401. Hence, the controller 220 selects (e.g. at the block 1308) a route 1403 for the communication device 103-3 through the critical areas 1401, for example through a train station and along a pedestrian path to the location 108. Hence, when the responder associated with the communication device 103-3 implements the route 1403, evidence may be acquired in the critical areas 1403 and/or the responder may be able to follow a suspected criminal onto a train and the like. Furthermore, the route 1403 may be further selected to reduce duplication with the other routes 701, 702-3.

Hence, provided herein is a device and method for electronically dispatching responders that reduces route duplication and/or increases circumstantial evidence collection.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" can be construed as X only, Y only, Z only, or any combination of at least two items X, Y, and Z (e.g., XYZ, XY, YZ, ZZ, and the like). Similar logic can be applied for at least two items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device for reducing duplication of arrival routes to an incident scene for a plurality of incident responders, the device comprising:
   a communication interface; and
   a controller having access to a map database, the controller configured to:
      receive, via the communication interface, a location of an incident;
      identify respective locations of at least two communication devices associated with respective responders;
      select, using the map database, different respective routes from the respective locations to the location of the incident for each of the at least two communication devices, the different respective routes selected to reduce duplication therebetween;
      provide the different respective routes to each of the at least two communication devices; and
      receive, via the communication interface, from the at least two communication devices, one or more of audio data and video data associated with the different respective routes, the one or more of the audio data and the video data received after the different respective routes have been provided to each of the at least two communication devices.

2. The device of claim 1, wherein the different respective routes are selected to reduce duplication therebetween by:
   selecting a respective route, from a plurality of routes, for a second communication device, having a smallest duplication with a fastest route for a first communication device.

3. The device of claim 1, wherein a first route, of the different respective routes, is a fastest route for a first communication device, and a second route, of the different respective routes, for a second communication device is selected by comparing a plurality of routes for the second communication device with the fastest route and using weighting metrics to reduce duplication therebetween.

4. The device of claim 1, wherein at least one of the different respective routes comprises a fastest route from a respective location of a respective communication device to the location.

5. The device of claim 1, wherein at least one of the different respective routes is selected based on map features within a perimeter around the location.

6. The device of claim 1, wherein the location of the incident is received with an incident type, and wherein the controller is further configured to:
   determine a perimeter around the location based on the incident type; and
   identify the respective locations of the at least two communication devices associated with the respective responders located within the perimeter.

7. The device of claim 1, wherein the different respective routes selected to reduce duplication therebetween by:
   selecting a fastest route to the location for a first communication device;
   determining a plurality of routes to the location for a second communication device; and
   selecting a respective route, from the plurality of routes, for the second communication device, having a smallest duplication with the fastest route for the first communication device.

8. The device of claim 1, wherein controller is further configured to:
   analyze one or more of the audio data and the video data to identify evidence associated with the incident; and
   when any evidence in one or more of the audio data and the video data has been identified, transmit a notification, via the communication interface, to one or more of the at least two communication devices.

9. The device of claim 8, wherein the notification is for instructing one or more of the at least two communication devices to collect the evidence.

10. The device of claim 8, wherein the notification is for redirecting one or more of the at least two communication devices to a location where the evidence was identified.

11. A method for reducing duplication of arrival routes to an incident scene for a plurality of incident responders, the method comprising:
   receiving, at a controller, via a communication interface, a location of an incident;
   identifying, at the controller, respective locations of at least two communication devices associated with respective responders;

selecting, at the controller, using a map database accessible to the controller, different respective routes from the respective locations to the location of the incident for each of the at least two communication devices, the different respective routes selected to reduce duplication therebetween;

providing, using the controller, the different respective routes to each of the at least two communication devices; and receiving, at the controller, via the communication interface, from the at least two communication devices, one or more of audio data and video data associated with the different respective routes, the one or more of the audio data and the video data received after the different respective routes have been provided to each of the at least two communication devices.

12. The method of claim 11, wherein the different respective routes are selected to reduce duplication therebetween by:
selecting, at the controller, a respective route, from a plurality of routes, for a second communication device, having a smallest duplication with a fastest route for a first communication device.

13. The method of claim 11, wherein a first route, of the different respective routes, is a fastest route for a first communication device, and a second route, of the different respective routes, for a second communication device is selected by comparing a plurality of routes for the second communication device with the fastest route and using weighting metrics to reduce duplication therebetween.

14. The method of claim 11, wherein at least one of the different respective routes comprises a fastest route from a respective location of a respective communication device to the location.

15. The method of claim 11, wherein at least one of the different respective routes is selected based on map features within a perimeter around the location.

16. The method of claim 11, wherein the location of the incident is received with an incident type, and wherein the method further comprises:
determining, at the controller, a perimeter around the location based on the incident type; and
identifying, at the controller, the respective locations of the at least two communication devices associated with the respective responders located within the perimeter.

17. The method of claim 11, wherein the different respective routes selected to reduce duplication therebetween by:
selecting a fastest route to the location for a first communication device;
determining a plurality of routes to the location for a second communication device; and
selecting a respective route, from the plurality of routes, for the second communication device, having a smallest duplication with the fastest route for the first communication device.

18. The method of claim 11, further comprising:
analyzing, at the controller, one or more of the audio data and the video data to identify evidence associated with the incident; and
when any evidence in one or more of the audio data and the video data has been identified, transmitting a notification, via the communication interface, to one or more of the at least two communication devices.

19. The method of claim 18, wherein the notification is for instructing one or more of the at least two communication devices to collect the evidence.

20. The method of claim 18, wherein the notification is for redirecting one or more of the at least two communication devices to a location where the evidence was identified.

* * * * *